US010536977B1

(12) United States Patent
Naim et al.

(10) Patent No.: US 10,536,977 B1
(45) Date of Patent: Jan. 14, 2020

(54) CONTENTION BASED RANDOM ACCESS (71) Applicant: Sprint Spectrum LP, Overland Park, KS (US)

(72) Inventors: Muhammad Ahsan Naim, Ashburn, VA (US); Yu Zhou, Herndon, VA (US); Luca Zappaterra, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 39 days.

(21) Appl. No.: 15/004,140

(22) Filed: Jan. 22, 2016

(51) Int. Cl.
*H04W 74/08* (2009.01)
*H04W 74/00* (2009.01)
*H04W 72/04* (2009.01)

(52) U.S. Cl.
CPC ... *H04W 74/0833* (2013.01); *H04W 72/0453* (2013.01); *H04W 74/004* (2013.01); *H04W 74/0866* (2013.01)

(58) Field of Classification Search
CPC .............................................. H04W 74/0833
See application file for complete search history.

(56) References Cited

U.S. PATENT DOCUMENTS

| 8,547,927 | B2 | 10/2013 | Seo et al. |
| 8,682,318 | B2 | 3/2014 | Lee et al. |
| 2010/0172299 | A1* | 7/2010 | Fischer ............... H04W 74/002 370/328 |
| 2012/0147844 | A1* | 6/2012 | Kim ........................ H04L 5/001 370/330 |
| 2012/0314664 | A1* | 12/2012 | Johansson ......... H04W 74/0833 370/329 |
| 2013/0128733 | A1* | 5/2013 | Lee ........................ H04W 74/02 370/230 |
| 2013/0242730 | A1 | 9/2013 | Pelletier et al. |
| 2014/0160926 | A1* | 6/2014 | Gage ................. H04W 74/0833 370/235 |
| 2015/0365977 | A1* | 12/2015 | Tabet .................. H04J 13/0062 370/330 |
| 2016/0150570 | A1* | 5/2016 | Wang ................ H04W 74/0833 370/329 |
| 2016/0381713 | A1* | 12/2016 | Hwang ............. H04W 74/0833 370/329 |
| 2017/0006637 | A1* | 1/2017 | Sahlin ................ H04W 74/004 |

* cited by examiner

*Primary Examiner* — Jeffrey M Rutkowski
*Assistant Examiner* — Chae S Lee (57) ABSTRACT

Contention-based random access operations are enhanced by enabling wireless devices to transmit a plurality of orthogonal preambles simultaneously to an access node, thereby increasing the probability of at least one preamble being heard by the access node, and minimizing the risk of preamble collision with another wireless device. Different classes of devices may be configured to transmit different numbers of preambles, depending on a priority level for that class, for purposes such as emergency communications, real-time applications, etc. Parameters including relationships between specific priority levels, device classes, application classes, quality of service, and number of preambles permitted, may be broadcast or otherwise communicated to wireless devices by the wireless network.

19 Claims, 6 Drawing Sheets

CONTENTION BASED RANDOM ACCESS

TECHNICAL BACKGROUND

A wireless device attempting to establish communication with a wireless communication network typically sends a request for a communication channel to an access node using a random access procedure. A contention based random access procedure is used when, for example, a wireless device is handed over from one access node to another access node, when a wireless device exits an idle mode and attempts to re-establish communication with an access node, when a wireless device temporarily loses communication with an access node and attempts to re-establish communication, when data is available to be transmitted from the wireless device to the access node, etc. In a contention based random access procedure, a wireless device typically sends a channel request over a randomly selected random access channel (RACH). The channel request can comprise a random access preamble. When a channel request is received from the wireless device, the receiving access node can provide a positive indication that access is permitted in a random access response.

However, there exist a limited number of contention-based preambles, and multiple wireless devices transmitting the same preamble may result in a "collision" due to interference between the two identical preambles. As a result, only one of the wireless devices receives a positive indication in the random access response, while the other wireless device needs to re-initiate the contention based random access procedure. This is particularly disadvantageous for devices requiring a higher priority, such as for emergency communications, or real-time applications.

Overview

Exemplary embodiments described herein include systems, methods, and nodes for contention-based random access. A method for random access in a wireless network includes receiving, at an access node, a plurality of orthogonal preambles from a wireless device requesting a connection to the access node. The plurality of orthogonal preambles is transmitted simultaneously from the wireless device. The method further includes transmitting a random access response to the wireless device.

A system for random access in a wireless network includes an access node for providing network services to one or more wireless devices, and a processor communicatively coupled to the access node. The processor configures the access node to perform operations including receiving a plurality of preambles from said one or more wireless devices requesting a connection to the access node, and transmitting a random access response to at least one of said one or more wireless devices. At least a portion of the plurality of preambles is received simultaneously from a first wireless device of said one or more wireless devices.

A wireless device for random access in a wireless network includes a processor for enabling the wireless device to perform operations including selecting two or more random access preambles from a plurality of random access preambles that are orthogonal to one another, and transmitting said two or more random access preambles to an access node using a single subframe of a physical random access channel (PRACH).

DETAILED DESCRIPTION

In embodiments disclosed herein, contention-based random access operations are enhanced by enabling wireless devices to transmit a plurality of orthogonal preambles simultaneously to an access node, thereby increasing the probability of at least one preamble being heard by the access node, and minimizing the risk of preamble collision with another wireless device. The wireless devices enabled with this functionality may require a higher priority to access network services from an access node for purposes such as emergency communications, real-time applications, etc. Different classes of devices may be configured to transmit different numbers of preambles, depending on a priority level for that class. Parameters including relationships between specific priority levels, device classes, application classes, quality of service, and number of preambles permitted, may be broadcast or otherwise communicated to wireless devices by the wireless network. These and additional operations are further described with respect to the embodiments depicted in FIGS. 1-5 below.

Figure 1:
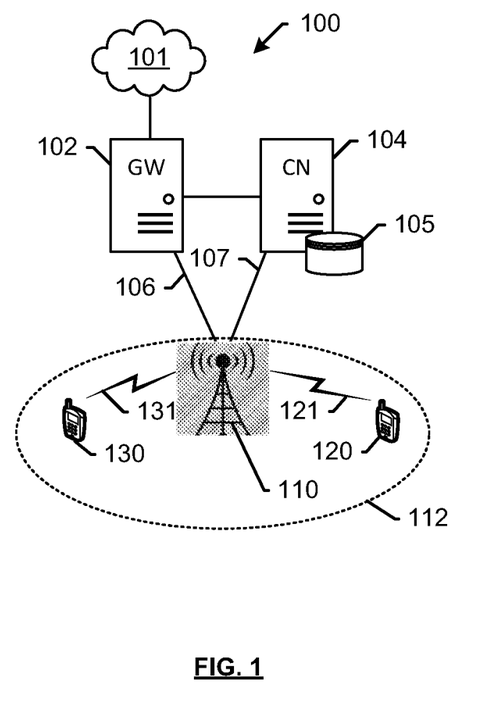
FIG. 1 depicts an exemplary system for contention-based random access.

FIG. 1 depicts an exemplary system 100 for contention-based random access. System 100 comprises a communication network 101, gateway 102, controller node 104, access node 110, and wireless devices 120, 130. Access node 110 is illustrated as having coverage area 112. Wireless devices 120, 130 are located within coverage area 112, and in wireless communication with access node 110 via communication links 121, 131, respectively. In exemplary embodiments described herein, access node 110 broadcasts network parameters to all wireless devices within range 112, including wireless devices 120, 130. Besides standard network parameters, the broadcasted network parameters may include information related to a number of preambles prescribed or authorized to be transmitted from wireless devices having specific priority levels, device classes, application classes, and quality of service requirements. When wireless devices 120, 130 initiate connections 121, 131 with access node 110, a wireless device transmitting a higher number of contention-based preambles simultaneously can increase its chances of a preamble being heard by access node 110, as opposed to wireless devices transmitting single preambles that may be lost due to preamble collisions.

Wireless devices 120, 130 may be any device, system, combination of devices, or other such communication platform capable of communicating wirelessly with access node 110 using one or more frequency bands deployed by access node 110. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, may include S1 communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing random access preamble information, including relationships between priorities/classes of devices and applications and numbers of authorized or permitted preambles per class. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access node 110 can be any network node configured to provide communication between UEs 120, 130, and communication network 101. Access node 110 can be a standard access node and/or a short range, low power, small access node. A standard access node can be a macrocell access node such as a base transceiver station, a radio base station, an eNodeB device, or an enhanced eNodeB device, or the like. In an exemplary embodiment, a macrocell access node can have a coverage area 112 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access nodes 110 can comprise a processor and associated circuitry to execute or direct the execution of computer-readable instructions to obtain information. Access nodes 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicates with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101

Figure 2:
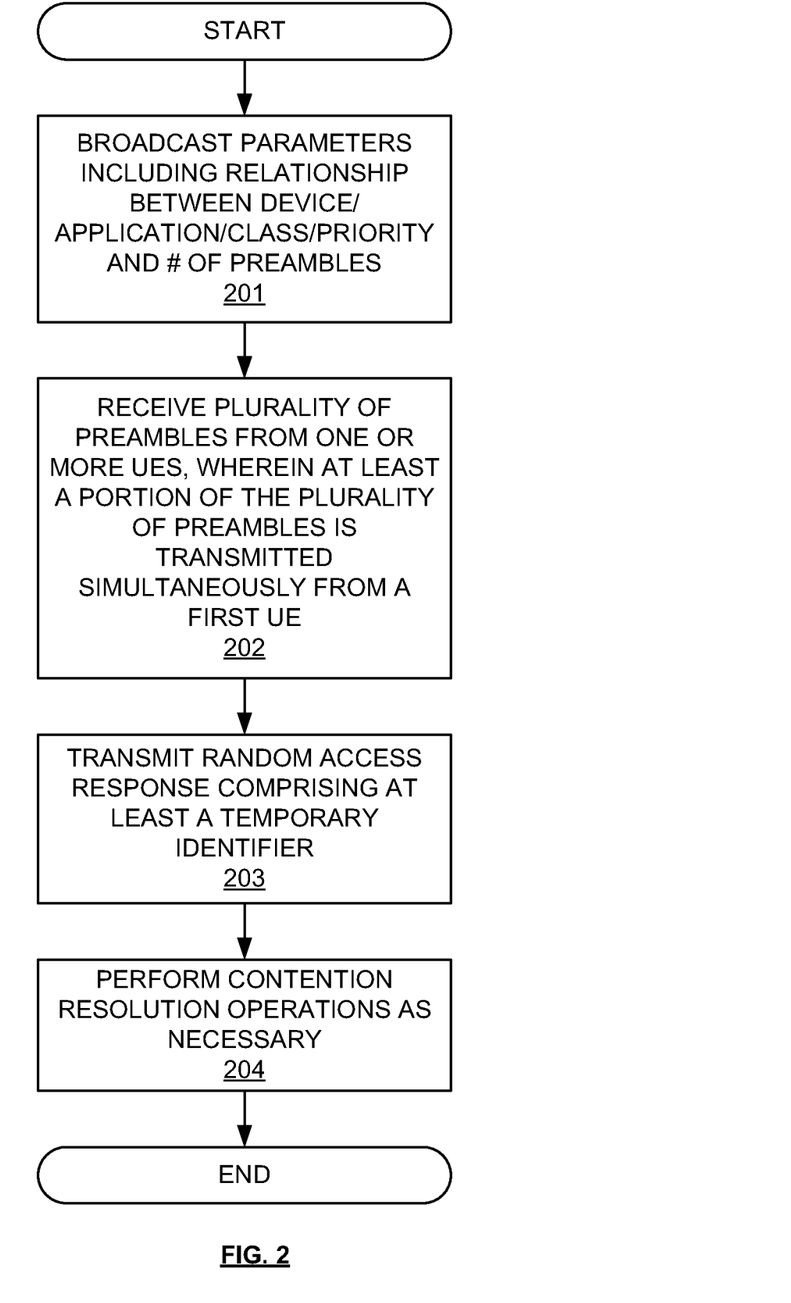
FIG. 2 depicts an exemplary method for contention-based random access at an access node.

FIG. 2 depicts an exemplary method for contention-based random access at an access node. The method is discussed with reference to the exemplary access node 110 illustrated in FIG. 1. However, the method can be implemented with any suitable network node. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 201, access node 110 (or any suitable network node) broadcasts or otherwise transmits to the wireless devices network parameters including at least a relationship between a class or priority of a wireless device or application, and a maximum number of simultaneous contention-based preambles that are permitted to be transmitted simultaneously by the wireless device or application. For example, network parameters generally include a master information block message in a broadcast channel, which contains the most essential parameters required for initial access, such as a location of the downlink and uplink carrier configuration. Further, additional system information can be transmitted in a physical downlink shared channel (PDSCH) and physical downlink control channel (PDCCH). For example, a SIB2 message contains common and shared channel configuration parameters. One or more of these messages may further include a configuration index of random access preambles. The configuration index may be linked with a maximum number of preambles that may be transmitted for a device of a specific class or priority, or using an application with specific requirements, such as QoS requirements.

In 202, the access node receives a plurality of preambles from one or more wireless devices (or user equipment, UE) that are attempting to access network services from the access node. Each wireless device receives the system information messages, and selects one or more preamble sequences from the plurality of preamble sequences in the configuration index of preamble sequences available in the wireless network. For the purposes of this disclosure, the terms "preamble" and "preamble sequence" may be used interchangeably. Generally, wireless devices randomly select the preamble sequence. However, given the available priority/class information, a wireless device having a specific priority/class, or using an application with specific requirements, may select multiple preambles to be transmitted simultaneously. Although generally only one preamble may be transmitted at a single time, i.e. with a subframe of an uplink channel, each preamble sequence in the index is orthogonal due to the Zadoff-Chu codes for each sequence. Consequently, more than one orthogonal preamble sequence may be transmitted at the same time, i.e. in the same subframe, by a single wireless device. Since any two or more wireless devices that pick the same single preamble sequence risk their preamble not reaching the access node due to preamble collision caused by interference, transmitting multiple orthogonal preambles simultaneously increases the probability of at least one preamble being heard by the access node, particularly as multiple orthogonal preambles may be received simultaneously by the access node without collision.

In 203, the access node transmits a random access response (RAR) with a temporary identifier in response to receiving each preamble. Generally, wireless devices receive the RAR and respond with a connection request including the temporary identifier. However, more than one wireless device may transmit connection requests; however, the access node can only setup one connection per received preamble. Therefore, the access node may perform contention resolution operations 204, as necessary. These operations are generally known to those having ordinary skill in the art. However, in the present case, the likelihood of contention resolution is minimized for a wireless device transmitting multiple simultaneous orthogonal preambles, since if one or a few preambles are subject to contention resolution, others may not even be subject to collision, and therefore result in granted connections.

Figure 3:
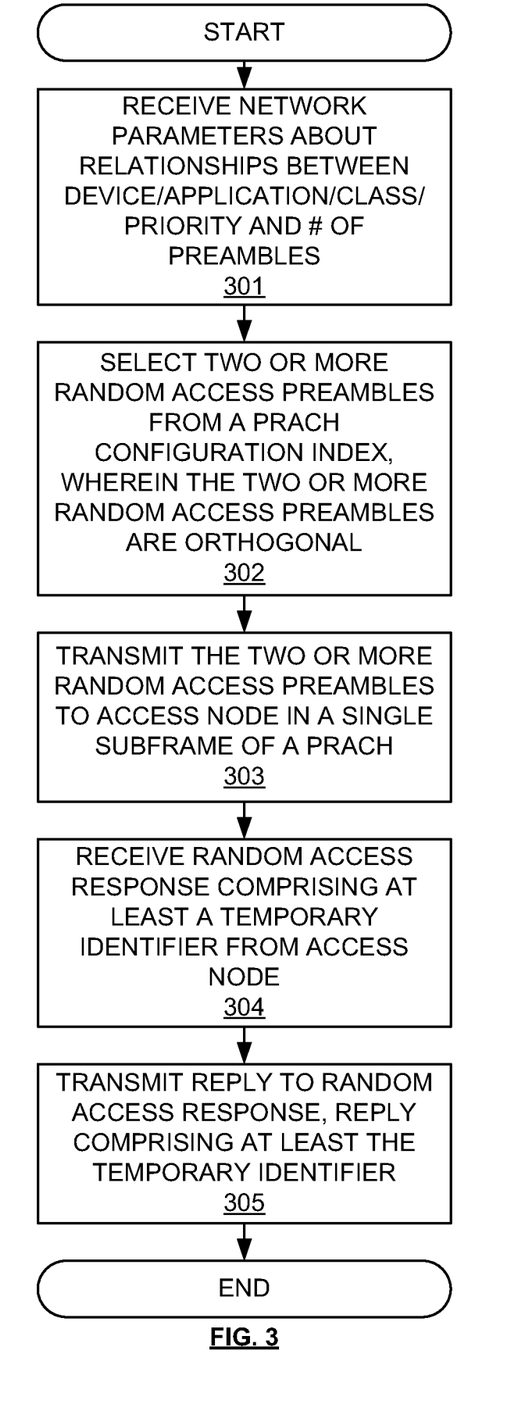
FIG. 3 depicts an exemplary method for contention-based random access at a wireless device.

FIG. 3 depicts an exemplary method for contention-based random access at a wireless device. The method is discussed with reference to an exemplary wireless device 120, 130 illustrated in FIG. 1. However, the method can be implemented with any suitable network device. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 301, a wireless device downloads or otherwise receives network parameters including at least a relationship between a class or priority of a wireless device or application, and a maximum number of simultaneous contention-based preambles that are permitted to be transmitted simultaneously by the wireless device or application. For example, network parameters may be broadcast or transmitted by an access node, and generally include system information messages comprising parameters required for initial access, such as a location of the downlink and uplink carrier configuration. A master information block may be downloaded from a broadcast channel, and other system information blocks may be downloaded from a physical downlink shared channel (PDSCH) and physical downlink control channel (PDCCH). One or more of these system information messages may further include a configuration index of contention-based random access preambles. The messages may also include a maximum number of preambles that may be transmitted for a device of a specific class or priority, or using an application with specific requirements, such as QoS requirements.

In 302, the wireless device selects two or more preamble sequences, depending on a class or priority of the device and/or an application executed thereon. The class or priority may be provisioned or enabled on the device prior to any connection attempt being made. By default, devices may select only one preamble. Any deviation from the default priority or class enables selection of multiple preambles.

Preamble sequences are selected from a plurality of preamble sequences in a configuration index of preamble sequences available in the wireless network, such as a physical random access channel (PRACH) configuration index that is broadcast or otherwise transmitted from the wireless network.

In 303, the selected preambles are transmitted to the access node in an attempt to initiate a connection. Generally, wireless devices transmit a single preamble in a subframe of an uplink channel, such as a PRACH. However, each preamble sequence in the index is orthogonal due to the Zadoff-Chu codes for each sequence. Consequently, more than one orthogonal preamble sequence may be transmitted at the same time, i.e. in the same subframe, by a single wireless device. Since any two or more wireless devices that pick the same single preamble sequence risk their preamble not reaching the access node due to preamble collision caused by interference, transmitting multiple orthogonal preambles simultaneously increases the probability of at least one preamble being heard by the access node, particularly as multiple orthogonal preambles may be received simultaneously by the access node without collision.

Figure 4:
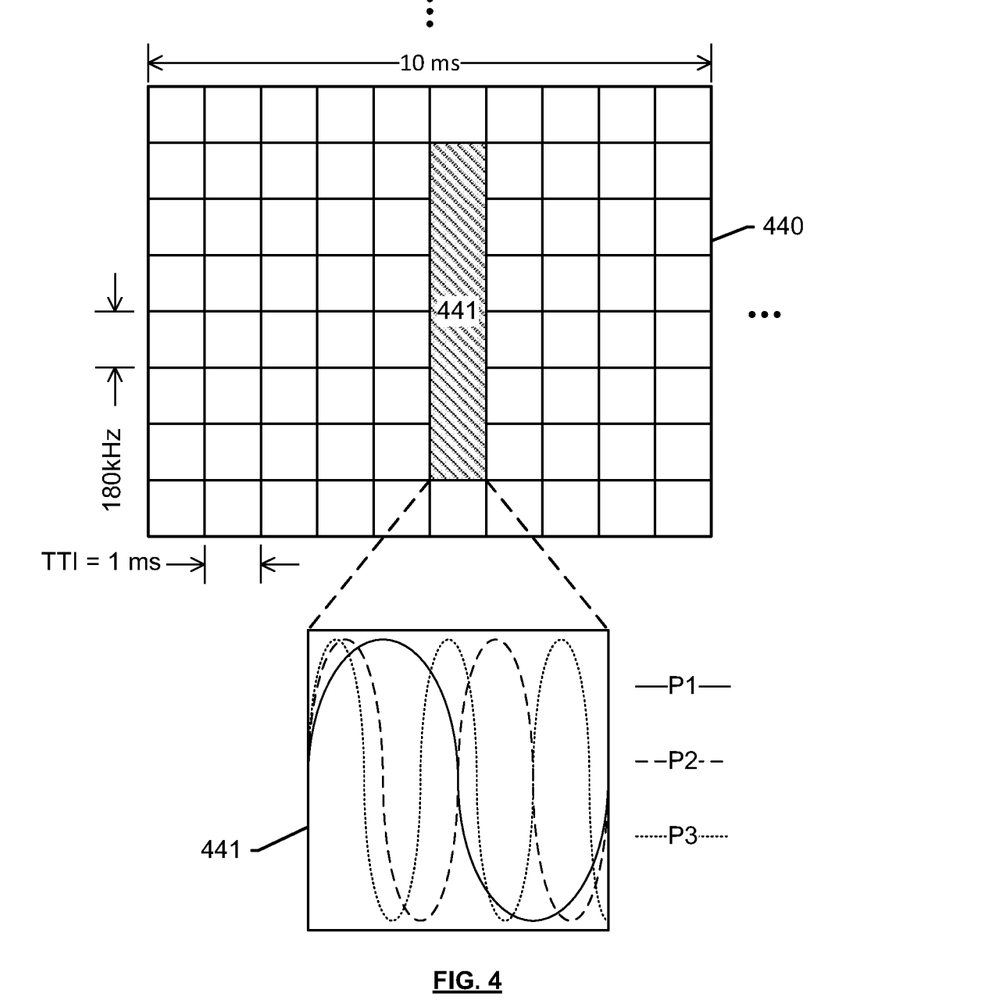
FIG. 4 depicts an exemplary subframe comprising a plurality of orthogonal preambles transmitted from a wireless device.

In 304, the wireless device receives one or more random access responses (RAR) with a temporary identifier, which are transmitted from the access node in response to receiving each preamble. Generally, wireless devices receive the RAR and respond with a connection request including the temporary identifier. However, since multiple preambles are transmitted, multiple RAR messages may be received from the access node. Therefore, the wireless device selects one identifier to respond with, and transmits a reply 305. If one of the preambles was subject to a contention resolution procedure at the access node, the random access response may include a contention resolution result. However, in the present case, the likelihood of contention resolution is minimized for a wireless device transmitting multiple simultaneous orthogonal preambles, since if one or a few preambles are subject to contention resolution, there is a greater chance that preamble sequences result in granted connections FIG. 4 depicts an exemplary PRACH resource block set (RBS) 441 within a data frame 440. Resource blocks 441 may be within a long-term evolution (LTE) subframe that is 1 ms in the time domain, and has a bandwidth (in the frequency domain) that is dependent upon a carrier bandwidth. Possible carrier bandwidths can be 1.4 Mhz, 3 MHz, 5 MHz, 10 MHz, 15 MHz and 20 MHz. A 180 KHz subset of the bandwidth may be referred to as a resource block (RB). For instance, the exemplary embodiment depicts a 10 ms LTE frame 440 divided into ten 1 ms sub-frames out of which 6 PRBs in a single subframe comprise a PRACH RBS 441. Other PRBs within the same subframe can carry PUCCH, PUSCH and other data simultaneously. For purposes of PRACH transmission, group of 6 PRBs comprising PRACH RBS 441 have a bandwidth of 1080 KHz and are used to transmit PRACH preambles that comprise a plurality of orthogonal preambles transmitted from a wireless device.

In particular, PRACH RBS 441 are used by a wireless device to transmit two or more preamble sequences that are orthogonal to one another. In the present embodiment, PRACH RBS 441 are used to transmit preambles P1, P2, and P3, each of which are orthogonal to one another. Although waveforms are used to depict preambles P1, P2, P3, this depiction is merely exemplary to show the orthogonality, and preambles P1, P2, P3 may comprise strings of code, or any other means for depicting preamble sequences that are otherwise known to those having ordinary skill in the art. It is to be noted that transmitting plural preambles P1, P2, P3 within a set of PRACH resource blocks implies that the preambles are being transmitted simultaneously, rather than in succession. Moreover, the orthogonality of preambles P1, P2, and P3 enables an access node to receive the preambles simultaneously as well.

Figure 5:
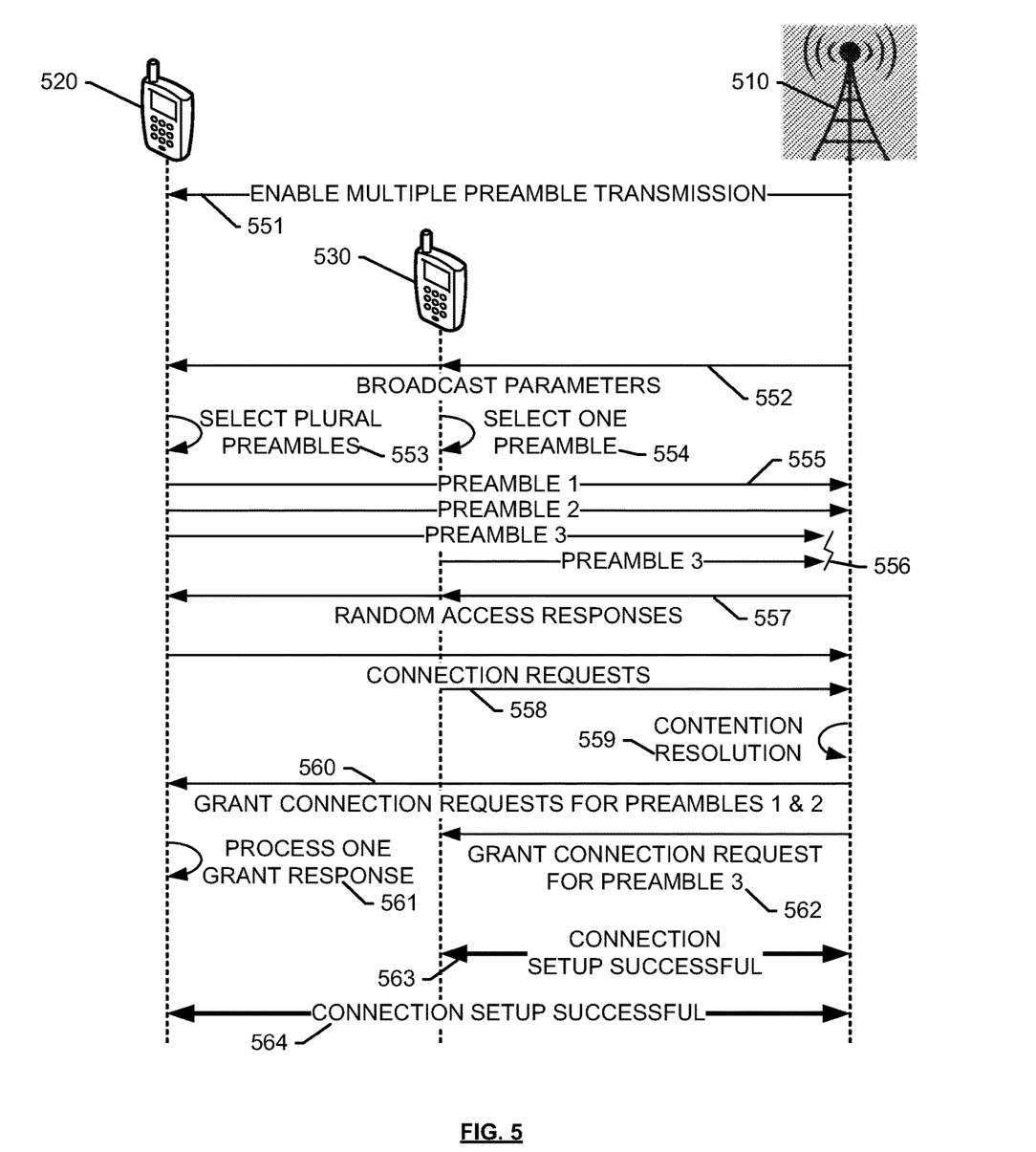
FIG. 5 depicts an exemplary network flow diagram for contention-based random access.

FIG. 5 depicts an exemplary network flow diagram for contention-based random access. The network flow is shown as being performed between a wireless device 520, wireless device 530, and access node 510. Prior to any attempt to access a network, wireless device 520 may be provisioned or enabled to perform transmittal of multiple preambles. The provision 551 may be received from access node 510, or any other access node. The provision 551 may be performed in response to wireless device 520 registering or requesting a higher priority or class. The provision 551 may be a programming performed on the wireless device as a result of subscribing to a higher-tier plan offered by the wireless network. In either case, at a time subsequent to step 551, access node 510 may broadcast or otherwise transmit network parameters in step 552 to wireless devices 520, 530 including at least a relationship between a class or priority of a wireless device or application, and a maximum number of simultaneous contention-based preambles that are permitted to be transmitted simultaneously by the wireless device or application. For example, network parameters may be broadcast or transmitted in 552 by access node 510 and, therefore, received by both wireless devices 520 and 530. Network parameters may include a master information block in a broadcast channel, and other system information blocks in a physical downlink shared channel (PDSCH) and physical downlink control channel (PDCCH). One or more of these system information messages may further include a configuration index of contention-based random access preambles. The messages may also include a maximum number of preambles that may be transmitted for a device of a specific class or priority, or using an application with specific requirements, such as QoS requirements.

At 553 and 554, each wireless device 520, 530 may select preambles to initiate a connection with access node 510. Wireless device 520 selects two or more preamble sequences, depending on a class or priority of the device and/or an application executed thereon, as provisioned or enabled on wireless device 520 in step 551. Wireless device 530 has a default priority/class, and therefore selects only one preamble. At 555, wireless device 520 transmits preambles 1, 2, and 3 to access node 510, while wireless device 530 transmits preamble 3 to access node 510. By definition, any unique preamble available for selection from a PRACH configuration index is necessarily orthogonal to each other. Consequently, when two different wireless devices select the same preamble, the sequences may be subject to collision. In this case, wireless device 520 is configured to select different orthogonal preambles 1, 2, and 3 in an effort to maximize its probability of a successful connection. However, wireless device 530 has also selected preamble 3 and, therefore, is subject to a collision 556 with preamble 3 transmitted by wireless device 520.

At 557, access node 510 transmits random access responses (RAR) with temporary identifiers for each preamble received at access node 510. Similar to parameter transmittal 552, this random access response 557 is transmitted via the PDCCH and may include timing parameters. The PDCCH is available to all wireless devices within range, and therefore, may be received by both wireless device 520 and 530. Generally, wireless devices receive the RAR and respond with a connection request including the temporary identifier. Since multiple preambles are transmitted, multiple RAR messages may be received from access node 510. At 558, each wireless device 520, 530 transmits a reply with a connection request. The reply may include a unique identifier or random number from the RAR 557.

Upon receiving the replies, based on the identifiers/random numbers received with the connection requests, access node 510 may perform contention resolution operations 559. The contention resolution includes a determination of which preamble was successfully received versus unsuccessfully received, based on the connection requests 558. For example, preamble 3 from wireless device 520 may have been lost, while preamble 3 from wireless device 530 was successfully received. In this case, the connection request from wireless device 520 regarding preamble 3 may be denied, while the connection request from wireless device 530 may be granted.

Therefore, access node transmits grant responses for each connection request based on a successfully received preamble. In this case, wireless device 520 receives grant response 560 for preambles 1 and 2, as these were not lost due to collision. Wireless device 520 processes grant response at 561, to select just one and discard the rest that are not needed. Meanwhile, wireless device 530 receives a grant response 562 for preamble 3. Since each wireless device 520 and 530 has at least one successful grant response, both wireless devices 520 and 530 are now successfully connected with connections 563 and 564, respectively. Thus, the likelihood of contention resolution is minimized for wireless device 520 by virtue of transmitting multiple simultaneous orthogonal preambles The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 510, wireless devices 120, 130, and/or network 101.

Figure 6:
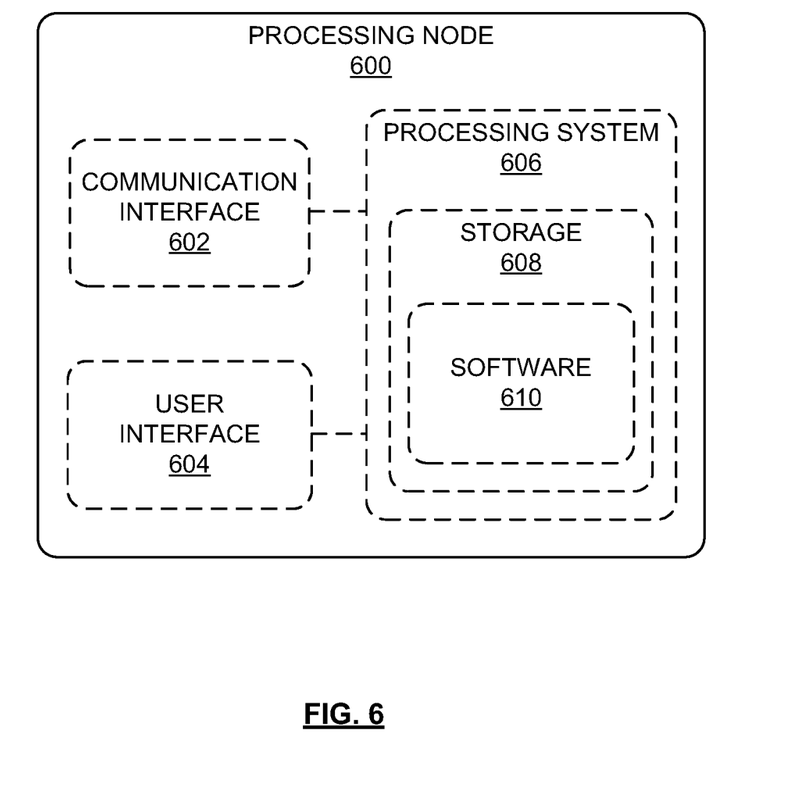
FIG. 6 depicts an exemplary processing node.

FIG. 6 depicts an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a call admission control module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for random access in a wireless network, the method comprising:
broadcasting, by an access node to a plurality of wireless devices in the wireless network, a message comprising a configuration index of orthogonal preambles, the configuration index being linked with a relationship between a device class of each of the plurality of wireless devices and a maximum number of orthogonal preambles that are permitted to be simultaneously transmitted within a single subframe by said each of the plurality of wireless devices;
receiving, at the access node, a plurality of orthogonal preambles from a wireless device requesting a connection to the access node, wherein the plurality of orthogonal preambles is simultaneously transmitted within a first subframe from the wireless device, and wherein a number of orthogonal preambles simultaneously transmitted from the wireless device is based on the device class of the wireless device; and
transmitting a random access response to the wireless device.

2. The method of claim 1, wherein the plurality of orthogonal preambles comprise contention-based random access preambles.

3. The method of claim 2, wherein the plurality of orthogonal preambles is received on a physical random access channel (PRACH).

4. The method of claim 1, wherein the random access response comprises a timing advance value enabling the wireless device to synchronize its transmissions.

5. The method of claim 1, wherein the random access response comprises a scheduling grant for the wireless device to send data using a physical uplink shared channel (PUSCH).

6. The method of claim 1, wherein the random access response comprises a temporary identifier for the wireless device.

7. The method of claim 6, further comprising receiving a response from the wireless device, the response including the temporary identifier.

8. The method of claim 7, further comprising granting the requested connection.

9. The method of claim 8, wherein granting the requested connection further comprises finalizing a contention resolution procedure.

10. The method of claim 9, further comprising initiating the contention resolution procedure upon receiving an additional preamble to said one or more plurality of orthogonal preambles, wherein said additional preamble is transmitted by an additional wireless device.

11. A system for random access in a wireless network, the system comprising:
an access node for providing network services to one or more wireless devices; and
a processor communicatively coupled to the access node, the processor for configuring the access node to perform operations comprising:
broadcasting a message comprising a configuration index of orthogonal preambles, the configuration index being linked with a relationship between a device class of each of the one or more wireless devices and a maximum number of orthogonal preambles that are permitted to be simultaneously transmitted within a single subframe by said each of the one or more wireless devices;
receiving a plurality of preambles simultaneously transmitted from said one or more wireless devices requesting a connection to the access node; and
transmitting a random access response to at least one of said one or more wireless devices,
wherein at least a portion of the plurality of preambles is simultaneously received within a first subframe from a first wireless device of said one or more wireless devices, and wherein a number of preambles within the portion of the plurality of preambles is based on the maximum number device class of the first wireless device.

12. The system of claim 11, wherein each preamble from the portion of the plurality of preambles is orthogonal to one another.

13. The system of claim 12, wherein a first preamble of the portion of the plurality of preambles matches a second preamble of the plurality of preambles, the second preamble being received from a second wireless device.

14. The system of claim 13, wherein the operations further comprise resolving a contention resolution procedure between the first preamble and the second preamble.

15. The system of claim 11, wherein the operations further comprise instructing the first wireless device to transmit said portion of the plurality of preambles simultaneously.

16. The system of claim 15, wherein the first wireless device requires a higher-than-default quality of service (QoS).

17. The system of claim 15, wherein the first wireless device requires a higher-than-default priority.

18. A wireless device for random access in a wireless network, the wireless device comprising a processor for enabling the wireless device to perform operations comprising:
receiving, from an access node, a broadcast of a message comprising a configuration index of orthogonal preambles, the configuration index being linked with a relationship between a device class of the wireless device and a maximum number of random access preambles that are permitted to be simultaneously transmitted within a single subframe by the wireless device;
selecting a number of random access preambles from a plurality of random access preambles that are orthogonal to one another, the number being less than or equal to the maximum number of random access preambles; and
simultaneously transmitting said number of random access preambles to an access node using a first single subframe of a physical random access channel (PRACH).

19. The wireless device of claim 18, wherein the plurality of random access preambles are stored within a PRACH configuration index.

* * * * *